United States Patent [19]

Van der Linde et al.

[11] Patent Number: 4,686,270

[45] Date of Patent: Aug. 11, 1987

[54] PROCESS FOR PREPARING AND PROCESSING A RESIN COMPOSITION

[75] Inventors: Robert Van der Linde; Johan Rietberg, both of Zwolle, Netherlands

[73] Assignee: DSM Resins B.V., Zwolle, Netherlands

[21] Appl. No.: 762,325

[22] Filed: Aug. 5, 1985

[30] Foreign Application Priority Data

Aug. 9, 1984 [NL] Netherlands ..................... 8402455

[51] Int. Cl.[4] ..................... C08G 59/00; C08G 63/00; C08G 63/48; C08G 63/54
[52] U.S. Cl. .................................. 527/601; 523/437; 523/438; 524/906; 524/914; 527/604; 528/295.3; 528/295.5; 528/297
[58] Field of Search ............... 527/601, 604; 524/906, 524/914; 528/295.3, 295.5, 297; 523/437, 438

[56] References Cited

U.S. PATENT DOCUMENTS

| | | | |
|---|---|---|---|
| 2,889,293 | 6/1959 | Hensley et al. | 527/604 |
| 2,909,496 | 10/1959 | Cooke et al. | 525/438 |
| 2,980,638 | 4/1961 | Polovina | 527/604 |
| 3,308,077 | 3/1967 | Pattison et al. | 524/576 |
| 3,979,477 | 9/1976 | Schmid et al. | 528/297 |
| 4,113,702 | 9/1978 | Psencik | 528/297 |
| 4,340,698 | 7/1982 | De Jongh et al. | 525/438 |
| 4,474,940 | 10/1984 | Wilk et al. | 528/297 |
| 4,474,941 | 10/1984 | Wilk et al. | 528/297 |

Primary Examiner—Ronald W. Griffin
Attorney, Agent, or Firm—Cushman, Darby & Cushman

[57] ABSTRACT

Resin compositions comprising two resins A and B, wherein resin A consists of the reaction product of an epoxidized fatty acid ester of a polyvalent alcohol and a monovalent carboxylic acid and resin B consists of a carboxylic acid modified fatty acid ester of a polyvalent alcohol.

These resins compositions are suitable for linoleum manufacture.

18 Claims, No Drawings

PROCESS FOR PREPARING AND PROCESSING A RESIN COMPOSITION

FIELD OF THE INVENTION

The invention relates to a resin composition comprising a mixture of two resins which is suitable for the preparation of a surface-covering layer, and in particular for the preparation of linoleum. Though the invention is expressly not limited to this, in the following the invention will be elucidated on the basis of the preparation of linoleum.

BACKGROUND OF THE PRESENT INVENTION

In the processes so far applied for the preparation of a resin composition for linoleum manufacture (the resin composition hereinafter to be referred to as linoleum cement; in the linoleum preparation it is also called Bedford cement, after the manner in which it is formed), use is made of one or more polyunsaturated oils, which are 'dried' by air oxidation. Drying oils are understood to mean esters of natural fatty acids with polyvalent alcohols, in particular glycerol or pentarethritol. During or after drying, oils are mixed with a resin, in particular with colophonium, yielding the Bedford cement. This cement is mixed with fillers and pigments, following which the linoleum mix thus obtained is applied to a, mostly jute, substrate, usually with the aid of a twin roller mill. The product formed is cured at 60°–80° C. for a number of weeks (see, e.g., Ullmann, Encyklopädie der technischen Chemie, Band 12 (1976), p. 24 ff. and Encycl. of Pol. Sci. and Techn. Vol. 1 (1964), p. 403 ff.).

The disadvantage of the customary process for preparing linoleum is the long time required for curing of the product, while this time depends on the thickness of the linoleum layer. Furthermore, intensive manual inspection is required to determine whether the desired hardness has been reached.

Shortening of the drying time has been investigated before, but none of the possible solutions suggested has found wide application (Encycl. of Pol. Sci. and Techn. Vol. 1 (1964), pp. 103/4).

SUMMARY AND OBJECT OF THE PRESENT INVENTION

The resin composition of the present invention may be characterized as comprising resin A and resin B wherein resin A consists of the reaction product of an epoxidized fatty acid ester of a polyvalent alcohol and a monovalent carboxylic acid and resin B consists of a carboxylic acid modified fatty acid ester of a polyvalent alcohol. The resin compositions of the present invention are well-suited for linoleum manufacture.

The invention described here provides a resin composition which is eminently suitable as linoleum cement, the time for the necessary curing of the linoleum being substantially shortened and the homogeneity of the material thus obtained being improved.

In application, the resin composition of the present invention eliminates the exclusive dependence in prior manufacturing techniques on the diffusion of oxygen from the air to and in the product because in the resin composition in this invention curing occurs via cross linking of the reactive groups already present in the product.

Further, application of the resin composition according to the present invention provides air after-curing which in some applications is most desirable. The air after-curing is desirable in view of the required ease of handling of a product which is not yet fully cured during final processing procedures.

The resin composition according to the present invention provides a "linoleum cement" having a lower viscosity than a "linoleum cement" produced in accordance with traditional conventional techniques.

Other advantages of the present invention will be apparent from the following detailed description of the invention.

DETAILED DESCRIPTION OF THE INVENTION

The resin composition according to the invention, comprising a mixture of two resins, hereinafter to be called A and B, is characterized in that resin A consists of the reaction product of an epoxidized fatty acid ester of a polyvalent alcohol and a monovalent carboxylic acid, and in that resin B consists of a carboxylic acid-modified fatty acid ester of a polyvalent alcohol. The term 'carboxylic-acid-modified' in this context also covers the presence of carboxylic-anhydride groups instead of, or besides, carboxylic acid groups.

The linoleum curing method that has until now been customary is based on oxidative 'drying' of the double bonds still present in the oils applied, use being made of liquid driers (e.g. lead decanate). When a resin composition according to the invention is applied, 'drying' takes place by crossslinking of the reactive groups already present in the product, eliminating the exclusive dependence in the manufacture on diffusion of oxygen from the air to and in the product. An additional advantage is that curing takes place much more uniformly throughout the material, which has a favourable effect on the product properties. Application of the resin composition according to the invention still allows air after-curing, which in some applications is desirable in view of the required ease of handling of product not yet fully cured during final processing.

Surprisingly, it has been found that when applying a resin composition according to the invention the curing time of the linoleum obtained in accordance with the invention can be reduced substantially in comparison with the application of Bedford cement according to the technique known since long.

Where linoleum hardness is controlled using the curing time in traditional processes, it has been found that the degree of hardening of a linoleum prepared in accordance with the invention can be controlled by the degree to which carboxylic acid groups are present in resin B.

Linoleum cement obtained according to the invention has a lower viscosity than cement obtained by the traditional method. As a result, mixing of fillers and pigments to obtain the linoleum mix can be greatly simplified.

One of the most important drying oils currently used for linoleum preparation is linseed oil, which is oxidized with atmospheric oxygen to convert it into a solid, rubbery, elastic material called Linoxyn. Other oils, drying less rapidly, such as soy-bean oil, sunflower oil, or a tall oil fatty acid ester, are applied solely or in combination with linseed oil. Surprisingly, it has been found that in the preparation of a linoleum according to the invention not only linseed oil can be applied, but also said oils having a longer drying time, both separately and combined, without any great lengthening of the curing time taking place.

In the resin composition according to the invention a combination of two resins is applied, both resins being prepared on the basis of such a (modified) drying oil.

The drying oil in resin A is applied in epoxidized form. In particular an epoxide of soy-bean oil, linseed oil, sunflower oil and/or a tall oil fatty acid ester are used. The polyvalent alcohol used for esterification is preferably from among the following glycerol, pentaerithrytol and trimethylolpropane. Mixtures of these or other polyvalent alcohols such as polyalkylene glycols may also be applied.

In resin A suitable monovalent carboxylic acids include for instance, benzoic acid, para-tertiary-butylbenzoic acid, rosin, tall oil fatty acid, stearic acid and/or mixtures thereof. For the linoleum preparation preference is given in particular to rosin as monovalent acid, this with a view to retaining the properties characteristic of linoleum which originate from the rosin. Besides the monovalent carboxylic acid referred to, use may also be made of a combination with a polyvalent carboxyl acid, e.g. up to 10 mol % (relative to the total amount of carboxylic acid). Suitable carboxylic acids for this purpose are those with 4-54 C-atoms in the molecule. In particular, a di- or trimer fatty acid, or a mixture thereof, or acid terminated polyesters can be applied as a polyvalent carboxylic acid.

Advantageously, the carboxylic acid-modified ester in resin B consists of the reaction product of an unsaturated fatty acid ester of a polyvalent alcohol and one or more ethylenically unsaturated mono- or polyvalent carboxylic acids or their anhydrides. As unsaturated fatty acid ester, a vegetable oil or a tall oil fatty acid ester can be started from, esterification having been effected in particular with a polyvalent alcohol from the group formed by glycerol, pentaerithrytol and trimethylolpropane, while mixtures of these or other polyvalent alcohols can also be applied. In the context of this invention, suitable vegetable oils in particular are soy-bean oil, linseed oil, olive oil, safflower oil and/or rape seed oil.

The ethylenically unsaturated carboxylic acid, or its anhydride, used for the preparation of resin B, may contain one or more ethylenically unsaturated groups in the molecule. As monovalent carboxylic acid, use can preferably be made of acrylic acid, methacrylic acid, sorbic acid and/or crotonic acid. As polyvalent carboxylic acid, use can preferably be made of maleic acid and/or fumaric acid. Maleic anhydride is particularly suitable for the purpose, the so-called maleinated oils being easy to prepare and commercially available.

The carboxylic acid-modified ester in resin B may also consist of the reaction product of a hydroxy-functional fatty acid ester of a polyvalent alcohol and a polyvalent carboxylic acid. For this, in particular the esters can be applied that are derived from castor oil, hydroxystearic acid and/or hydroxypalmitic acid. The polyvalent alcohol used for esterification then is preferably chosen from the group formed by glycerol, pentaerithrytol and trimethylolpropane. Mixtures of these or other polyvalent alcohols can also be applied. The polyvalent carboxylic acid that is reacted with the abovementioned hydroxy-functional fatty acid ester can by preference be taken from the group formed by phthalic acid, tetra- or hexahydrophthalic acid and trimellitic acid.

Besides the description of resin B given in the above, the resin may also consist of one or more acid-functional alkyd resins.

By preference, in the preparation according to the present invention first, resin A is prepared by reacting the epoxidized ester with the monovalent carboxylic acid. This preparation takes place at a temperature of 100° to 250° C. and by preference of 150° to 200° C., optionally in the presence of a catalyst. As catalyst, by preference the customary catalyst for the acid-epoxy reaction is applied, for instance triethylamine.

Preparation of the resin composition according to the invention is preferably effected by combining resin A with resin B at a temperature of 60° to 150° C., and preferably at a temperature of 80° to 100° C. For this, a catalyst of the same type as in the preparation of resin A can be used.

In the preparation of linoleum subsequently the fillers and other additives are added, everything being done exactly as is customary in present-day linoleum production.

Curing of a linoleum prepared according to the invention then takes place at a temperature of 50° to 95° C. in some hours or days, depending on the desired linoleum quality, which in its turn is determined by the component mix applied.

Since curing of the linoleum obtained according to the invention takes place by chemical crosslinking rather than by oxidative drying, as in the traditional method, it is now possible to replace the time-consuming, manual final inspection by a more instrumental setting of the drying conditions, which depend on the desired properties of the linoleum to be prepared, which in their turn are determined by the comlinoleum to be prepared, which in their turn are determined by the composition of the linoleum cement used.

Though the preceding mainly discussed the application of the resin composition according to the invention in the preparation of linoleum, the application of the resin composition obtained according to the invention is not restricted thereto. Another systems using resin compositions, customarily in the form of so-called two components resins, to obtain a surface covering layer are also suitable for application of this resin composition. Among the applications that can be considered are roof coverings and the so-called 'Unterbodenschutz' in the automotive industry.

The invention will be elucidated with reference to the following non-restrictive example.

EXAMPLE 1

Preparation of resin A1

A 3-l reaction vessel provided with a mechanical stirrer, thermometer and a vertical cooler is supplied with 60 parts by weight epoxidized linseed oil (Edenol B 316 of Henkel with an oxirane content of more than 8.5%), 40 parts by weight rosin and 1 part by weight triisobutylamine. While nitrogen is being passed over it, the reaction mixture is heated to 180° C. The contents of the reaction vessel are kept at this temperature until the acid number has decreased to 3 mg KOH/g. The product is subsequently cooled. The epoxy equivalent weight is 600.

Preparation of resin B1

In equipment similar to that used for resin A1, 878 parts by weight linseed oil are heated to 200° C. under nitrogen. Next, 294 parts by weight maleic anhydride are cautiously added, divided into portions over two hours. Care is taken that the temperature does not rise above 200° C. After everything has been added, the temperature is gradually raised to 225° C. and maintained for 4 hours.

Preparation of the resin composition

The components obtained according to (1) and (2) are mixed in a ratio of 1:1. In line with the known linoleum technique, cork powder, chalk and pigments are added. The linoleum mix (mix 1) obtained is then cured in sheets at 80° C. during 3 hours. An elastic, tough linoleum material is obtained.

EXAMPLE 2

Preparation of resin A2

In the way as described in Example 1 (resin A1), 79 parts by weight of epoxidized soya oil (Edenol D81, oxirane content above 6.0%, ex Henkel), 18 parts by weight of p-tertiarybutylbenzoic acid, 1.6 parts by weight of dimerised fatty acid (Empol 1014, ex Unichema Chemie, 5 mol % 20 calculated on total carboxylic acid) and 1 part by weight of triisobutylamine were charged to a 3 l reaction vessel. The mixture was heated to 180° C. and kept at that temperature until the acid value was 1.4 mg KOH/g. The epoxy equivalent weight was 668.

Preparation of resin B2

In the way as described in Example 1 (resin B1), 67 parts by weight of Castor oil (hydroxyl-value 160–170 mg KOH/g) and 33 parts by weight of trimellitic anhydride were charged to a 3 l reaction vessel. The mixture was heated to 180° C. at which temperature the trimellitic anhydride dissolved and reacted.
The acid value of the product was 195 mg KOH/g. (Theory: 195 mg KOH/g).

EXAMPLE 3

Preparation of resin compositions

The compounds as prepared in examples 1 and 2 were mixed in the following proportions, together with cork powder, chalk and pigments, in line with the known linoleum techniques:
Mix 2: 2 parts of resin A1 and 5 parts of resin B2
Mix 3: 1 part of resin A2 and 1 part of resin B1
Mix 4: 2 parts of resin A2 and 5 parts of resin B2
The linoleum mixes were then cured in sheets at 80°–120° C. during 1–4 hours.
Elastic, tough linoleum materials were obtained.

I claim:

1. A cross-linkable resin composition comprising:
resin A which consists of the reaction product of an epoxidized fatty acid ester of a polyvalent alcohol and a monovalent carboxylic acid; and
resin B which consist of a carboxylic acid-modified fatty acid ester of a polyvalent alcohol.

2. The resin composition according to claim 1, wherein resin B consists of the reaction product of an unsaturated fatty acid ester of a polyvalent alcohol and at least one ethylenically unsaturated monovalent carboxylic acid, polyvalent carboxylic acid, or anhydride thereof.

3. The resin composition according to claim 2, wherein in resin B said ethylenically unsaturated carboxylic acid is acrylic acid, methacrylic acid, sorbic acid, crotonic acid, fumaric acid, maleic acid, maleic acid anhydride, methacrylic acid anhydride, sorbic acid anhydride, crotonic acid anhydride, fumaric acid anhydride, or mixtures thereof.

4. The resin composition according to claim 1, wherein resin B consists of the reaction product of a hydroxy-functional fatty acid ester of a polyvalent alcohol and (i) a polyvalent carboxylic acid or (ii) an anhydride of a polyvalent carboxylic acid.

5. The resin composition according to claim 4, wherein said hydroxy-functional fatty acid ester is derived from castor oil and esters derived from hydroxystearic acid, hydroxypalmitinic acid, hydroxystearic acid and hydroxypalmitinic acid, and from glycerol, pentaerythritol, trimethylolpropane and polyalkyleneglycol.

6. The resin composition according to claim 4, wherein said resin B the polyvalent carboxylic acid or its anhydride is phthalic acid, tetra- or hexahydrophthalic acid, trimellitic acid, phthalic acid anhydride, tetra-hydrophthalic acid anhydride, or hexahydrophthalic acid anhydride, trimellitic acid anhydride, and mixtures thereof.

7. The resin composition according to claim 1, wherein the fatty acid ester of said resin A and said resin B is soya bean oil, linseed oil, sunflower oil, olive oil, safflower oil, rapeseed oil, a tall oil fatty acid ester or a mixture thereof.

8. The resin composition according to claim 1, wherein in both resin A and resin B said polyvalent alcohol is glycerol, pentaerythritol, trimethylolpropane, or polyalkyleneglycol.

9. The resin composition according to claim 1, wherein in resin A said monovalent carboxylic acid is benzoic acid, para-tertiary-butyl-benzoic acid, tall oil fatty acid, stearic acid, rosin or a mixture thereof.

10. The resin composition according to claim 1, wherein in resin A said monovalent carboxylic acid is rosin.

11. The resin composition according to claim 1, wherein said resin B consists of at least one acid-functional alkyd resin.

12. A curable cross-linkable resin composition comprising:
at least two resins A and B,
wherein resin A consists of the reaction product of:
(i) at least one epoxidized fatty acid ester selected from the group consisting of epoxidized soya bean oil, epoxidized linseed oil, epoxidized sunflower oil, epoxidized olive oil, epoxidized safflower oil, epoxidized rapeseed oil and epoxidized tall oil fatty acid ester, with
(ii) at least one carboxylic acid selected from the group consisting of benzoic acid, paratertiary butylbenzoic acid, tall oil fatty acid, stearic acid and rosin, and
wherein resin B consists of the reaction product of:
(i) at least one unsaturated fatty acid ester selected from group consisting of soya bean oil, linseed oil, safflower oil and rapeseed oil, with
(ii) at least one carboxylic acid selected from the group consisting of acrylic acid, methacrylic acid, sorbic acid, crotonic acid, fumaric acid, maleic acid and maleic anhydride.

13. The resin composition comprising at least two resins A and B,
wherein resin A consists of the reaction product of:

(i) at least one epoxidized fatty acid ester selected from the group consisting of epoxidized soya bean oil, epoxidized linseed oil, epoxidized sunflower oil, epoxidized olive oil, epoxidized safflower oil, epoxidized rapeseed oil and epoxidized tall oil fatty acid ester, with (ii) at least one carboxylic acid selected from the group consisting of benzoic acid, paratertiary butylbenzoic acid, tall oil fatty acid, stearic acid and rosin, and wherein resin B consists of the reaction product of:

(i) at least one hydroxyfunctional fatty acid ester, selected from the group consisting of castor oil and esters derived from hydroxystearic acid, hydroxypolumetric acid, hydroxystearic acid and hydroxypolumetric acid and from glycerol, pentaerythritol, trimethylolpropane, polyalkyleneglycol, and mixtures thereof, with (ii) at least one carboxylic acid selected from the group consisting of phthalic acid, tetra-hydrophthalic acid, hexahydrophthalic acid, trimellitic acid and the respective anhydrides thereof.

14. A process for preparing a resin composition, comprising:

admixing a resin A and a resin B wherein resin A is obtained by reacting an epoxidized fatty acid ester of a polyvalent alcohol with a monovalent carboxylic acid at a temperature of 100°–250° C. and said resin B is obtained by reacting a fatty acid ester of a polyvalent alcohol with a reagent adding carboxylic acid and/or carboxylic anhydride groups to said ester, wherein said resin A and said resin B are combined at a temperature of 60°–150° C.

15. Process according to claim 14, characterized in that resin A and B are combined at a temperature of 80°–120° C.

16. Object prepared by using a resin composition comprising at least two resins A and B, wherein resin A consists of the reaction product of an epoxidized fatty acid ester of a polyvalent alcohol and a monovalent carboxylic acid, while resin B consists of a carboxylic acid-modified fatty acid ester of a polyvalent alcohol.

17. Object according to claim 16 characterized in that it constitutes a surface-covering layer.

18. Object according to claim 16 characterized in that it constitutes a linoleum.

* * * * *